US010321467B2

(12) United States Patent
Pearson et al.

(10) Patent No.: US 10,321,467 B2
(45) Date of Patent: Jun. 11, 2019

(54) METHOD AND APPARATUS FOR PROVISIONING A COMMUNICATION DEVICE

(71) Applicant: AT&T Intellectual Property I, L.P., Atlanta, GA (US)

(72) Inventors: Larry B. Pearson, San Antonio, TX (US); Anup Karnalkar, Allen, TX (US); Kevin S. Kim, Sungnam (KR); Daehyun Lee, Suwon (KR)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 238 days.

(21) Appl. No.: 14/820,044

(22) Filed: Aug. 6, 2015

(65) Prior Publication Data
US 2015/0341944 A1 Nov. 26, 2015

Related U.S. Application Data

(63) Continuation of application No. 13/782,800, filed on Mar. 1, 2013, now Pat. No. 9,137,808, which is a (Continued)

(51) Int. Cl.
| | | |
|---|---|---|
| *H04W 4/50* | (2018.01) | |
| *H04W 4/80* | (2018.01) | |
| *H04L 29/12* | (2006.01) | |
| *H04M 1/725* | (2006.01) | |
| *H04W 12/02* | (2009.01) | |
| *H04W 12/04* | (2009.01) | |
| *H04W 16/16* | (2009.01) | |
| *H04W 24/02* | (2009.01) | |
| *H04W 72/08* | (2009.01) | |
| *H04W 76/10* | (2018.01) | |
| *H04W 84/12* | (2009.01) | |

(52) U.S. Cl.
CPC ....... *H04W 72/082* (2013.01); *H04L 61/2015* (2013.01); *H04M 1/725* (2013.01); *H04M 1/72505* (2013.01); *H04W 4/50* (2018.02); *H04W 4/80* (2018.02); *H04W 24/02* (2013.01); *H04W 76/10* (2018.02); *H04M 2250/06* (2013.01); *H04M 2250/08* (2013.01); *H04W 12/02* (2013.01); *H04W 12/04* (2013.01); *H04W 16/16* (2013.01); *H04W 84/12* (2013.01)

(58) Field of Classification Search
CPC ... H04W 52/243; H04W 72/082; H04B 15/00
See application file for complete search history.

(56) References Cited

U.S. PATENT DOCUMENTS 7,039,017 B2 * 5/2006 Sherlock ............... H04W 24/00
370/252
7,408,907 B2 8/2008 Diener
(Continued)

*Primary Examiner* — Ayaz R Sheikh
*Assistant Examiner* — Debebe A Asefa
(74) *Attorney, Agent, or Firm* — Toler Law Group, PC

(57) ABSTRACT

A method includes sending, from a base unit, provisioning information to a first device. The provisioning information is associated with the first device establishing a connection with a network device. The method includes identifying a source of interference with the connection. The method also includes sending, to the first device, information indicating an operation state of the source of the interference.

20 Claims, 3 Drawing Sheets

Related U.S. Application Data continuation of application No. 11/686,209, filed on Mar. 14, 2007, now Pat. No. 8,412,102.

(56) References Cited

U.S. PATENT DOCUMENTS

| | | | |
|---|---|---|---|
| 7,774,774 B1* | 8/2010 | Mulligan | G06F 9/44505 |
| | | | 717/168 |
| 8,412,102 B2 | 4/2013 | Pearson et al. | |
| 2004/0028003 A1 | 2/2004 | Diener et al. | |
| 2004/0203593 A1 | 10/2004 | Whelan et al. | |
| 2005/0174976 A1 | 8/2005 | Wang | |
| 2005/0226356 A1* | 10/2005 | Pirzada | G06F 11/00 |
| | | | 375/350 |
| 2006/0217137 A1* | 9/2006 | Kushalnagar | H04B 17/345 |
| | | | 455/501 |
| 2006/0291439 A1 | 12/2006 | Yang et al. | |
| 2008/0026745 A1 | 1/2008 | Grubb | |

* cited by examiner

METHOD AND APPARATUS FOR PROVISIONING A COMMUNICATION DEVICE

CLAIM OF PRIORITY

This application claims priority from, and is a continuation of, U.S. patent application Ser. No. 13/782,800, filed on Mar. 1, 2013, which is a continuation of and claims priority to U.S. patent application Ser. No. 11/686,209, filed on Mar. 14, 2007, now issued as U.S. Pat. No. 8,412,102, each of which is incorporated herein by reference in its entirety.

FIELD OF THE DISCLOSURE

The present disclosure relates generally to provisioning techniques, and more specifically to a method and apparatus for provisioning a communication device.

BACKGROUND

Wireless networking eliminates the use of cables thereby offering users greater mobility. A common form of wireless networking is wireless fidelity—also known as WiFi. Often a communication device can be in the vicinity of more than one WiFi access point. In such situations the communication device generally needs to be directed to select one of the access points, and for access points configured for secure communications, an encryption key (e.g., WiFi Protected Access or Wired Equivalency Privacy) has to be supplied. For users without technical expertise this process can be undesirable.

A need therefore arises for a method and apparatus for provisioning a communication device.

DETAILED DESCRIPTION

Embodiments in accordance with the present disclosure provide a method and an apparatus for provisioning a communication device.

In a first embodiment of the present disclosure, a communication device can have a controller element that establishes wireless communication with a base unit operating according to a short-range cordless phone communication protocol, and receives from the base unit provisioning information that enables a communication device to establish wireless communications with an access point operating according to a wireless fidelity (WiFi) communications protocol.

In a second embodiment of the present disclosure, a computer-readable storage medium in a base unit can have instructions for establishing wireless communications with a communication device according to a short-range cordless phone communication protocol, and transmitting to a communication device provisioning information that enables the communication device to establish wireless communications with an access point operating according to a WiFi communications protocol.

In a third embodiment of the present disclosure, a method can involve transporting WiFi provisioning information over a short-range cordless phone communication medium.

Figure 1:
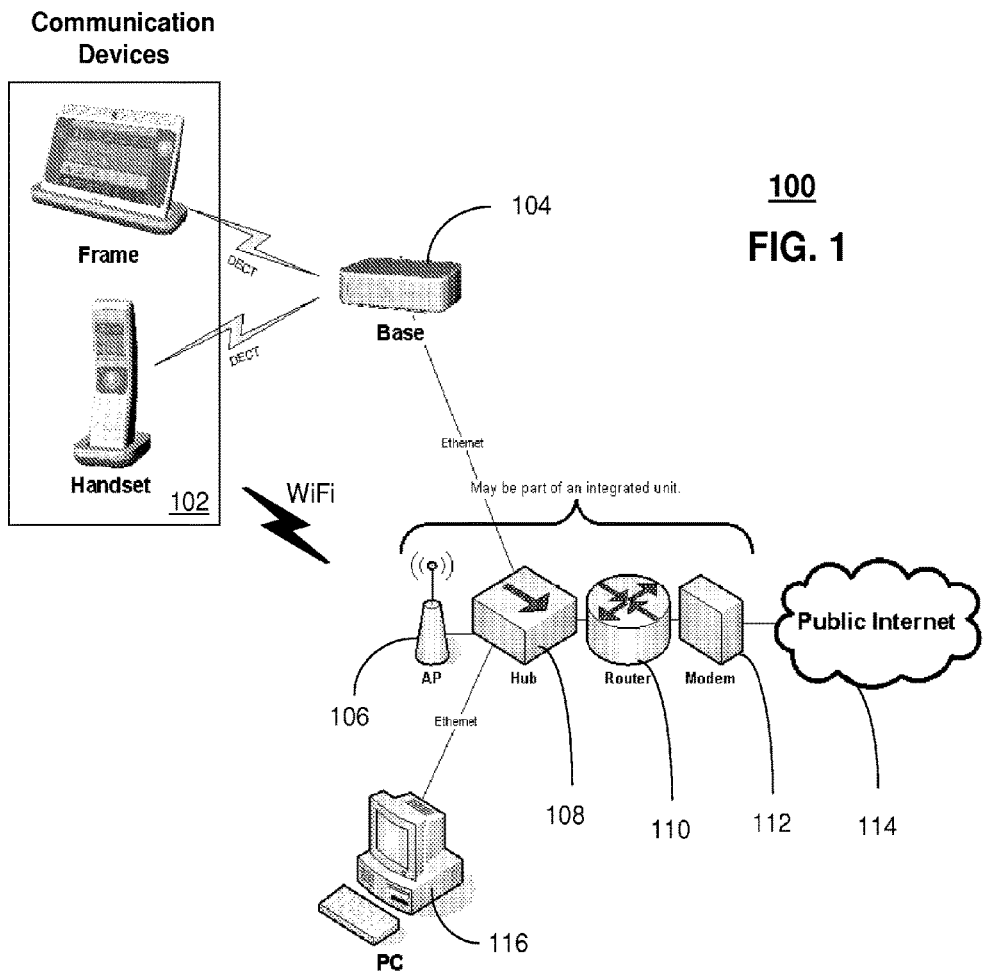
FIG. 1 depicts an exemplary embodiment of a communication system.

FIG. 1 depicts an exemplary embodiment of a communication system 100. The communication system 100 can comprise one or more communication devices 102, a base unit 104, an access point (AP) 106, an Ethernet hub 108, a router 110, and a modem 112 coupled to the Internet by way of common interfaces (e.g., xDSL, cable, satellite, etc.). The AP 106 forms a wireless network between the communication devices 102 and the Internet 114 by way of the combined operations of the hub 108, router 110, and modem 112. The AP 106 conforms to IEEE's family of 802.11 standards (e.g., 802.11a, b, g or n) and can typically communicate with the communication devices 102 within a radius of 100 meters or so.

The Ethernet hub 108 also known as concentrator can be used for connecting multiple twisted pair or fiber optic Ethernet devices together as a single segment. The Ethernet hub 108 is thus a form of multiport repeater. The router 110 can forward data packets across a network to a desired destination through a process known as routing. Routing occurs at Layer 3 (the network layer) of the Open Systems Interconnect (OSI) model. The modem 112 modulates on a forward channel an analog carrier signal to encode digital information, and demodulates on a reverse channel a carrier signal to decode the transmitted information. The task of the modem 112 is to produce a signal that can be transmitted over a communication network and decoded to reproduce the original digital data over long distances. The modem 112 can provide broadband digital services over an xDSL, cable or other suitable interface.

The base unit 104 can include short-range cordless phone technology conforming to, for example, a Digital Enhanced Cordless Telecommunications (DECT) protocol, or a Personal Handy-phone System (PHS) protocol. The cordless phone technology allows the base unit 104 to communicate with the communication devices 102 over short distances, e.g., 50-100 meters. For cordless communications, the base unit 104 transmits and receives signals at, for example, a 5.8 GHz carrier frequency to prevent interference with the WiFi AP 106 which operates generally at a carrier frequency of 2.4 GHz. The base unit 104 can monitor signals at 2.4 GHz for purposes which will be described shortly. As might be expected, the base unit 104 can be integrated in whole or in part with one or more of the above components (e.g., the AP 106, the hub 108, the router 110, and/or the modem 112).

Figure 2:
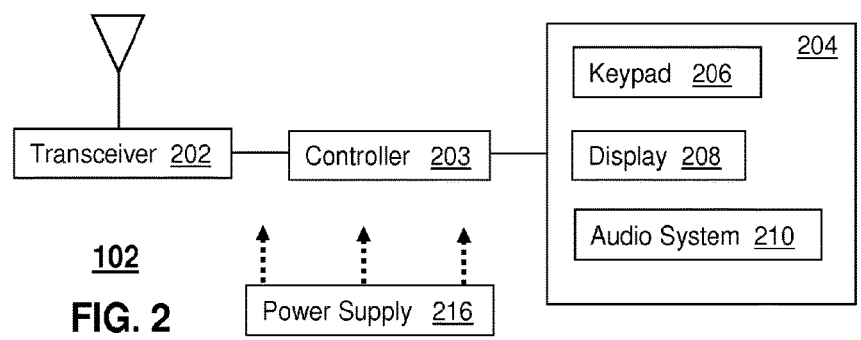
FIG. 2 depicts an exemplary embodiment of a communication device operating in the communication system.

FIG. 2 depicts an exemplary embodiment of the communication device 102. The communication device 102 can comprise a wireless transceiver 202, a user interface (UI) 204, a power supply 216, and a controller 203 for managing operations of the foregoing components. The transceiver 202 is a device that has both a transmitter and receiver. The transceiver 102 can have a dual-mode function that supports a cordless phone technology as described above for the base unit 102, and WiFi communications. To establish communications with the base unit 104, the transceiver 202 transmits and receives signals at the same carrier frequency, 5.8 GHz. As noted earlier, this carrier frequency can help to prevent interference with the WiFi AP 106. In a supplemental embodiment, the transceiver 102 can also support a common plain old telephone service (POTS) wired interface.

The UI element 204 can include a keypad 206 with depressible or touch sensitive keys and a navigation element such as a navigation disk, button, roller ball, or flywheel for manipulating operations of the communication device 102. The UI element 204 can further include a display 208 such as monochrome or color LCD (Liquid Crystal Display) which can be touch sensitive for manipulating operations of the communication device 102 and for conveying images to the end user of said device, and an audio system 210 that utilizes common audio technology for conveying and intercepting audible signals of the end user.

The power supply 216 can utilize common power management technologies such as replaceable batteries, supply regulation technologies, and charging system technologies for supplying energy to the components of the communication device 102 and to facilitate portable applications. Depending on the type of power supply 216 used, the communication device 102 can represent an immobile or portable communication device. The controller 203 can utilize computing technologies such as a microprocessor and/or digital signal processor (DSP) with associated storage memory such a Flash, ROM, RAM, SRAM, DRAM or other like technologies for controlling operations of the communication device 102.

The communication device 102 can represent a single operational device or a family of devices configured in a master-slave arrangement. In the latter embodiment, the components of the communication device 102 can be reused in different form factors for the master and slave terminal devices 100—see FIG. 1 (e.g., a touch-screen tablet referred to as a Frame, and a Handset).

Figure 3:
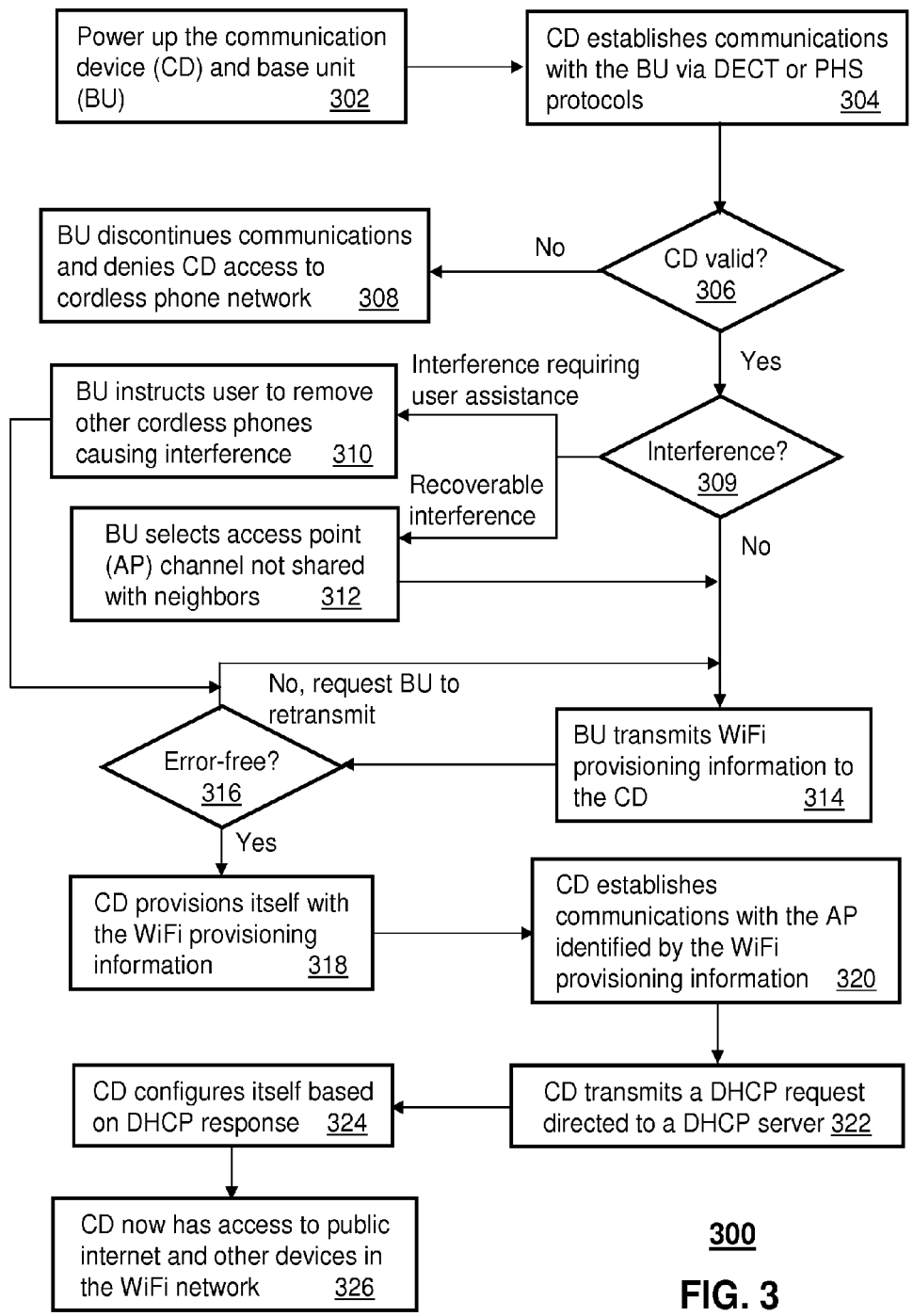
FIG. 3 depicts an exemplary method operating in portions of the communication system.

FIG. 3 depicts an exemplary method 300 operating in portions of the communication system 100. Method 300 begins with step 302 where the communication device 102 and base unit 104 are powered up. This step can represent an end user that purchases the aforementioned devices from a service provider of communication system 100, or retail store having an association with said provider. In either case, the base unit 104 can be provisioned by a salesperson with WiFi provisioning information consistent with services which the end user has subscribed to.

In step 304 the communication device 102 establishes communications with the base unit 104 utilizing a cordless phone wireless protocol such as DECT or PHS. Typically, there are no manual steps required to enable DECT or PHS communications between the communications device 102 and the base unit 104. For exemplary purposes only, DECT will be assumed to be the protocol used between the communication device 102 and the base unit 104. Upon establishing communications, the base unit 104 determines in step 306 if the communication device 106 belongs to its network. This step can be accomplished by the communication device 102 sharing with the base unit 104 its model and serial numbers over DECT followed by the base unit 104 verifying from data stored in its memory that one or both of said numbers is recognized. If the identification supplied by the communication device 102 is not recognized, the base unit 104 proceeds to step 308 where it discontinues communications with the communication device 102 and denies attempts by the communication device 102 to access its network.

If on the other hand the communication device 102 is recognized, the base unit 104 proceeds to step 309 where it checks for sources of interference for the AP 106. A first source of interference can be other cordless phones in the vicinity utilizing a 2.4 GHz carrier frequency. If one or more 2.4 GHz phones are detected, the base unit 104 proceeds to step 310 where it instructs the end user of the communication device 102 to remove or disable 2.4 GHz communication devices to avoid interference with the AP 106.

The base unit 104 can also detect in step 309 other WiFi APs in its vicinity. To perform this step, it is assumed that the WiFi AP 106 of the base unit 104 is integrated therewith. When other WiFi APs are detected, the base unit 104 checks the channel for each of these detected devices. It is well known that WiFi channels 1, 6 and 11 do not overlap in frequency spectrum, and therefore can operate at full power with no apparent interference. The base unit 104 can utilize this known fact to select in step 312 a non-overlapping channel for the communication device 102. In the very remote possibility that channels 1, 6 and 11 have multiple interferers, the base unit 104 can measure the power levels of each interferer and select from one of channels 1, 6 or 11 having the least amount of interference.

Once a channel has been selected, the base unit 104 proceeds to step 314 where it transmits WiFi provisioning information to the communication device 102. The provisioning information includes said communication channel selection (unless no interference was detected in which case the communication channel which the base unit 104 was pre-provisioned is used), a Service Set Identifier (SSID), a static Internet Protocol Address (IP), a security ID, and/or a Dynamic Host Configuration Protocol (DHCP) setting.

The SSID is a code attached to all packets on a WiFi network to identify each packet as part of that network. The code is a case sensitive text string which consists of a maximum of 32 alphanumeric characters. All communication devices 102 attempting to communicate with the WiFi AP 106 must share the same SSID. An IP address is a unique address assigned to each of the communication devices 102 in order to identify and communicate with each other on an IP network. Each participating network device, including a router 110, computers, and communication devices 102 can have their own unique IP address.

The security ID can represent a WiFi Protected Access (WPA) encryption key, or a Wired Equivalency Privacy (WEP) encryption key. A WPA is a class of encryption keys to secure wireless communications between devices communicating by way of the WiFi AP 106. WPA is a 256 bit encryption key which is a security improvement over 128 bit WEP encryption keys. WPA implements the majority of the IEEE 802.11i standard, and was intended as an intermediate measure to take the place of WEP encryption keys. DHCP defines a set of rules used by the communications device 102 to allow said device to request and obtain an IP address from a DHCP server which has a list of IP addresses available for assignment.

To reduce the possibility of an errored transfer of WiFi provisioning information, the base unit 102 can transmit the WiFi provisioning information in step 314 with error detection and/or correction data (e.g., a cyclic redundancy check or error correction code). If the communication device 102 detects in step 316 that the WiFi provisioning information is corrupt and cannot be reconstructed, it sends the base unit 104 a request to retransmit. Otherwise, the communication device 102 proceeds to step 318 where it provisions itself with the WiFi provisioning information, and in step 320 establishes communications with the AP 106 identified by said provisioning information once it detects a strong enough WiFi beacon signal from the AP.

In step 320 the communication device 102 transmits a DHCP request directed to a DHCP server by way of the AP 106. The DHCP server can be an integral part of the base unit 104 or a server operating as a network element of an Internet Service Provider's (ISP) communication network. The DHCP server responds with a DHCP response which the communication device 102 in step 324 utilizes to configure itself. The DHCP response can include, for example, a dynamic IP address, a subnet mask, a router address, and a Domain Name Server (DNS) address. The DHCP server automates the assignment of IP addresses, subnet masks, default gateway, and other IP parameters. Once the communication device 102 has completed step 324 it can access in step 326 the Internet 114 and other devices (e.g., printer or other computers) in the WiFi network established by the functional combination of the AP 106, the Ethernet hub 108, and the router 110, which as noted earlier can be an integral part of the base unit 104.

The embodiments of method 300 provide a means for configuring a communication device 102 with WiFi provisioning information with no manual intervention other than the possibility of requesting removal of cordless phones (step 310) that might cause interference to the AP 106. Method 300 is therefore a substantial improvement over prior art systems which generally require manual intervention to configure WiFi capable communication devices.

Upon reviewing these embodiments, it would be evident to an artisan with ordinary skill in the art that the present disclosure can be modified, reduced, or enhanced without departing from the scope and spirit of the claims described below. For example, the communication devices 102 can be pre-configured with static IP address thereby obviating steps 322-324. Additionally, the interference mitigation steps (309-312) can be removed, while maintaining the steps for provisioning the communication device 102 with WiFi parameters. These are but a few examples of modifications that can be applied to the present disclosure without departing from the scope of the claims. Accordingly, the reader is directed to the claims section for a fuller understanding of the breadth and scope of the present disclosure.

Figure 4:
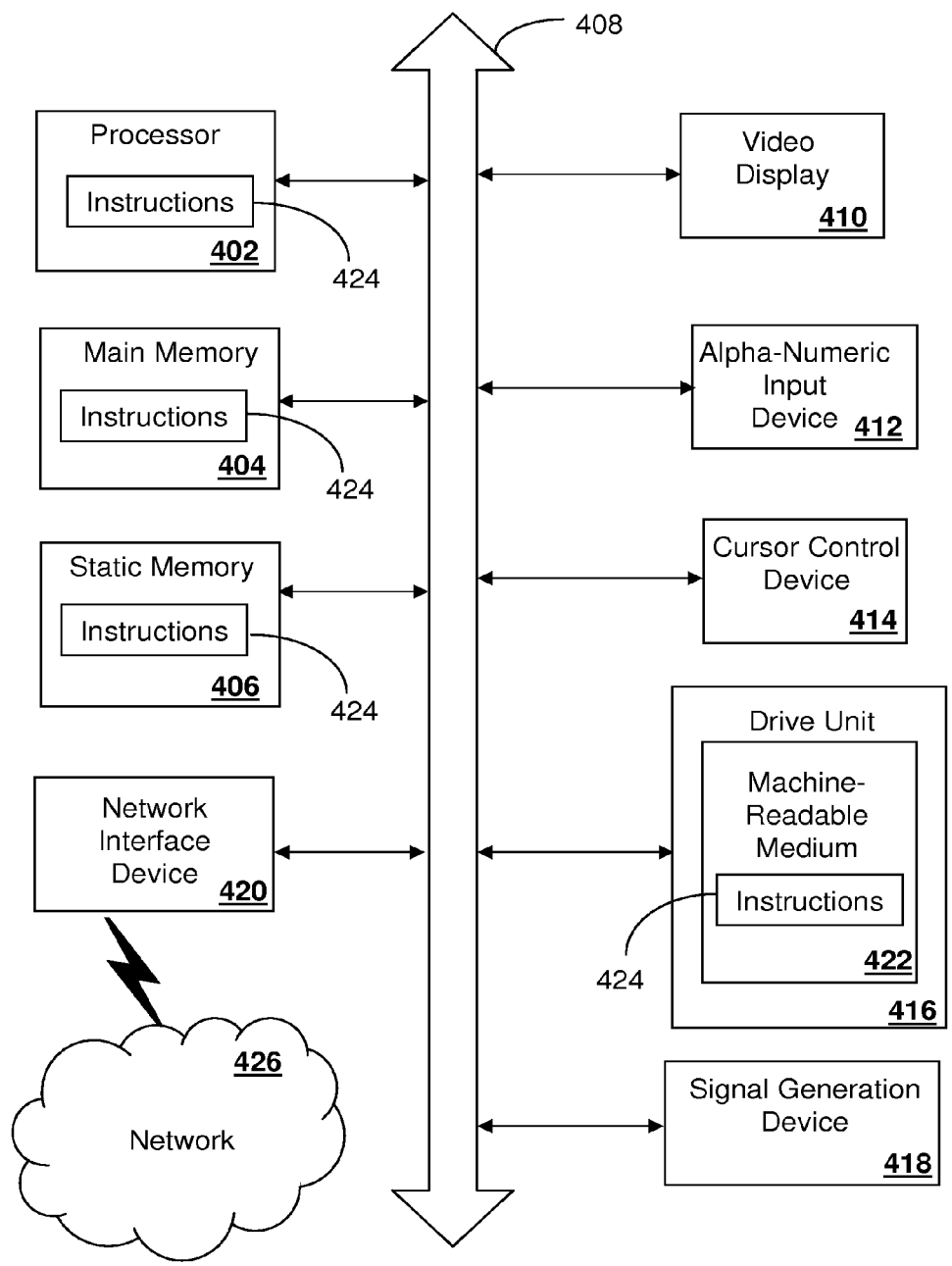
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
receiving, at a base unit from a first device, identification information for the first device via a first wireless connection between the first device and the base unit, wherein the base unit is configured to communicate using a first carrier signal in a first carrier signal frequency range for the first wireless connection; and
before establishment of a second wireless connection between the first device and an access point, the second wireless connection based on a second carrier signal in a second carrier signal frequency range:
monitoring, at the base unit, a portion of a frequency spectrum for second signals based on the second carrier signal frequency range, wherein the second signals are associated with a potential interference at the access point;
in response to detection of a potential interference signal and a determination that the potential interference signal is associated with a first potential source of interference, sending, from the base unit to the first device, a notification of the first potential source of interference; and
sending provisioning information to the first device from the base unit, wherein the provisioning information enables the first device to initiate the second wireless connection with the access point,
wherein the first carrier signal frequency range is different than the second carrier signal frequency range.

2. The method of claim 1, further comprising determining, at the base unit, that the first device is authorized to connect to the access point based on the identification information.

3. The method of claim 1, further comprising discontinuing communication with the first device in response to a determination that the first device is not authorized to connect to the access point based on the identification information.

4. The method of claim 1, wherein the first potential source of interference comprises a second device in a vicinity of the first device, the second device utilizing a carrier frequency used by the access point.

5. The method of claim 4, wherein the second device comprises a cordless phone.

6. The method of claim 1, wherein the first wireless connection is based on a 5.8 gigahertz carrier frequency, and wherein the second wireless connection is based on a 2.4 gigahertz carrier frequency.

7. The method of claim 1, wherein the base unit includes the access point.

8. The method of claim 7, further comprising:
receiving, at the base unit from the first device, a dynamic host configuration protocol request via the access point, wherein the dynamic host configuration protocol request is directed to a dynamic host configuration protocol server; and
sending, from the base unit to the first device via the access point, a dynamic host configuration protocol response, wherein the dynamic host configuration protocol response includes an internet protocol address, a subnet mask, a router address, a domain name server address, or a combination thereof.

9. The method of claim 1, further comprising:
determining a second potential source of interference based on a second access point in a communication range of the first device;

inhibiting the second potential source of interference by selection of a particular communication channel for the second wireless connection; and including the particular communication channel in the provisioning information.

10. A device comprising:

a wireless transceiver;

an output device;

a processor coupled to the wireless transceiver and coupled to the output device; and a memory accessible to the processor, the memory including instructions that, when executed by the processor, cause the processor to perform operations, the operations comprising:

causing the wireless transceiver to send identification information via a first wireless connection to a base unit, wherein the base unit is configured to communicate using a first carrier signal in a first carrier signal frequency range;

receiving, via the wireless transceiver from the base unit, a notification of a potential source of interference for associated with a second wireless connection between the wireless transceiver and an access point, the notification received prior to initiating the second wireless connection, wherein the second wireless connection is based on a second carrier signal in a second carrier signal frequency range used by the access point, wherein the second carrier signal frequency range is different than the first carrier signal frequency range;

outputting information regarding the potential source of interference to the output device; and in response to receiving provisioning information from the base unit, initiating the second wireless connection based on the provisioning information.

11. The device of claim 10, wherein the potential source of interference is due to a second device operating using a communication channel within the second carrier signal frequency range used by the access point.

12. The device of claim 10, wherein the processor and the memory are included in a wireless phone.

13. The device of claim 10, wherein the wireless transceiver is configured to use a first channel of a 5.8 gigahertz carrier signal frequency band for the first wireless connection and a second channel of a 2.4 gigahertz carrier signal frequency band for the second wireless connection.

14. A computer-readable storage device storing instructions that, when executed by a processor, cause the processor to perform operations, the operations comprising:

receiving, from a first device, identification information for the first device via a first wireless connection between the first device and a base unit, wherein the base unit is configured to communicate using a first carrier signal in a first carrier signal frequency range for the first wireless connection;

before establishment of a second wireless connection between the first device and an access point, the second wireless connection based on a second carrier signal in a second carrier signal frequency range:

monitoring, at the base unit, a portion of a frequency spectrum for second signals based on the second carrier signal frequency range, wherein the second signals are associated with a potential interference at the access point;

in response to detection of a potential interference signal and a determination that the potential interference signal is associated with a first potential source of interference, sending a notification of the first potential source of interference to the first device; and sending provisioning information to the first device, wherein the provisioning information enables the first device to initiate the second wireless connection with the access point, wherein the first carrier signal frequency range is different than the second carrier signal frequency range.

15. The computer-readable storage device of claim 14, wherein the second wireless connection comprises a short-range wireless communication connection.

16. The computer-readable storage device of claim 14, wherein the first potential source of interference comprises a second device in a vicinity of the first device, the second device utilizing a carrier frequency used by the access point.

17. The computer-readable storage device of claim 14, wherein the operations further comprise:

determining a second potential source of interference based on a second access point in a communication range of the first device;

inhibiting the second potential source of interference by selection of a particular communication channel for the second wireless connection; and identifying the particular communication channel in the provisioning information.

18. The computer-readable storage device of claim 14, wherein the operations further comprise determining that the first device is authorized to connect to the access point based on the identification information.

19. The computer-readable storage device of claim 18, wherein the operations further comprise resending the provisioning information to the first device in response to receipt of a retransmission request from the first device.

20. The computer-readable storage device of claim 14, wherein the provisioning information includes a service set identifier, a static internet protocol address, security identification information, a communication channel identifier, a dynamic host configuration protocol setting, or a combination thereof.

* * * * *